PLASMA-JET TORCH APPARATUS AND METHOD RELATING TO INCREASING THE LIFE OF THE BACK ELECTRODE

Original Filed Sept. 15, 1958 4 Sheets-Sheet 1

ADRIANO C. DUCATI
VERNON H. BLACKMAN
INVENTORS

BY

ATTORNEY

ADRIANO C. DUCATI
VERNON H. BLACKMAN
INVENTORS

BY Richard A. Gaudreau

ATTORNEY

ADRIANO C. DUCATI
VERNON H. BLACKMAN
INVENTORS

BY Richard L. Farrenkopf

ATTORNEY

ADRIANO C. DUCATI
VERNON H. BLACKMAN
INVENTORS

BY Richard K. Thompson
ATTORNEY

United States Patent Office

Re. 25,088
Reissued Nov. 21, 1961

25,088

PLASMA-JET TORCH APPARATUS AND METHOD RELATING TO INCREASING THE LIFE OF THE BACK ELECTRODE

Adriano C. Ducati, Newport Beach, and Vernon H. Blackman, Laguna Beach, Calif., assignors to Plasmadyne Corporation, Santa Ana, Calif., a corporation of California Original No. 2,941,063, dated June 14, 1960, Ser. No. 761,181, Sept. 15, 1958. Application for reissue July 14, 1961, Ser. No. 126,473
47 Claims. (Cl. 219—75)

Matter enclosed in heavy brackets [ ] appears in the original patent but forms no part of this reissue specification; matter printed in italics indicates the additions made by reissue.

This invention relates to plasma-jet torch apparatus incorporating means to increase the life of the back electrode, and to a method for effecting such increase. The invention also relates to a method and apparatus for regulating the heating time of substances passed through a plasma-jet torch.

In co-pending application Serial No. 747,094, filed July 7, 1958, for Plasma Stream Apparatus and Methods, now Patent No. 2,922,869, dated Jan. 26, 1960, inventors Gabriel M. Giannini and Adriano C. Ducati, assigned to the assignee of the present application, apparatus and methods are described for accomplishing (among numerous other objects) the object of increasing the life of the electrodes, particularly the nozzle. Such apparatus and methods have proved to be so successful that the life of the nozzle electrode is normally substantially greater than the life of the other electrode, which may be referred to as the back, base or plate electrode. It is therefore a principal object of the present invention to provide means and methods for increasing the life of the back electrode to make it approximate or exceed the life of the nozzle electrode.

The above-cited patent application also describes apparatus and methods for passing various substances through the plasma-jet torch in order to heat the substances for various purposes, including ceramic coating and metallizing. It is an object of the present invention to provide additional methods and apparatus for heating substances by passing the same through a plasma-jet torch, said torch being adapted to effect controlled generation of two plasma jets moving in diametrically opposite directions whereby the overall length of the double jet may be precisely regulated in a manner resulting in the desired heating of the substance passed therethrough.

An additional object comprises providing plasma-jet torch methods and apparatus whereby both the nozzle electrode and the back electrode have a long life, despite passage therethrough of extremely high currents with consequent greatly elevated temperatures.

Another object of the invention is to provide plasma-jet torch methods and apparatus which permit the passage of relatively high currents through the torch, at high current-densities and temperatures, without resulting in destroying of the electrodes until the expiration of long periods of time.

Another object of the invention is to provide plasma-jet torch apparatus incorporating a relatively neutral orifice plate between the nozzle and back electrodes, in combination with means for effecting spreading of the portion of the electric arc between the orifice plate and the back electrode.

A further object is to provide a plasma-jet torch having a back electrode the arcing portion of which comprises the wall of an opening in said electrode, said opening having a diameter substantially larger than that of the nozzle opening.

A further object is to provide a plasma-jet torch having a rotating back electrode.

A further object is to provide a plasma-jet torch incorporating magnetic means to spread the portion of the electric arc adjacent the back electrode.

A further object is to provide plasma-jet torch means incorporating a magnetic field arranged as a Fermi mirror tending to reflect particles away from the back electrode and thereby reduce the erosion effected by such particles on the back electrode.

The above and other objects and advantages of the invention will be more fully set forth in the following specification and claims, considered in connection with the attached drawings to which they relate.

Figure 1:
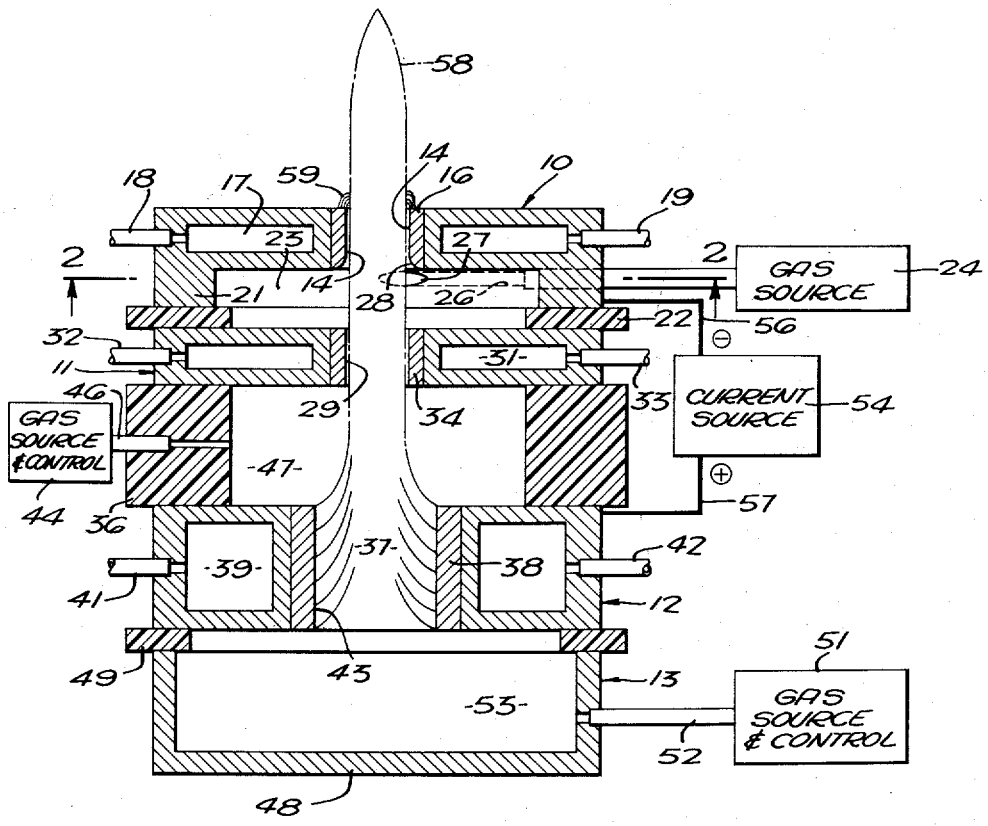
FIGURE 1 is a schematic longitudinal central sectional view illustrating a plasma-jet torch constructed in accordance with a first embodiment of the present invention.
Figure 2:
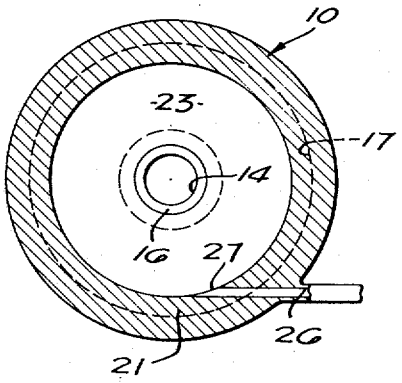
FIGURE 2 is a transverse section taken along line 2—2 of FIGURE 1, as viewed in the direction of the arrows.
Figure 3:
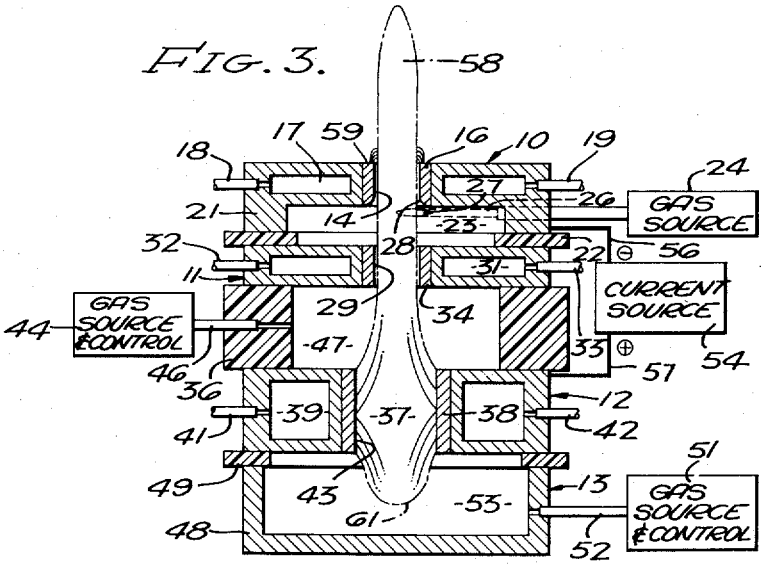
FIGURE 3 is a view corresponding to FIGURE 1 but illustrating the plasma condition when the gas pressure in the static chamber behind the back electrode is reduced in comparison to the static pressure represented in FIGURE 1.

Referring first to the embodiment shown in FIGURES 1–3, the torch is illustrated to comprise a nozzle electrode 10, an orifice plate 11, a back electrode 12, and means 13 to define a static pressure chamber on the side of the back electrode remote from the nozzle electrode. The elements 10—13 are suitably mounted in coaxial relationship by casing means, not shown.

Proceeding to a description of nozzle electrode 10 and adjacent elements, this comprises a disc-shaped metal plate, formed of a highly conductive metal such as copper, having a cylindrical nozzle opening 14 provided coaxially therein. The wall of opening 14 is protected by a tubular liner 16 formed of a suitable refractory metal such as tungsten. The body of the nozzle electrode is provided around liner 16 with an annular cooling chamber 17 through which a suitable coolant, such as water, may be continuously transmitted by means of conduits 18 and 19.

Nozzle 10 is formed with an integral skirt 21 which seats sealingly upon a suitable insulating gasket 22 above the orifice plate 11, the skirt having a cylindrical inner wall which is coaxial with nozzle opening 14. Such inner wall cooperates with the lower surface of the nozzle (around opening 14) and the upper surface of orifice plate 11 to define an annular pressure chamber 23. Fluid, preferably an oxidation-preventing gas such as argon, helium, nitrogen, etc., is introduced into the pressure chamber 23 for expansion upwardly through nozzle opening 14.

The gas for chamber 23 flows from a suitable gas source 24 through a passage 26 which extends through skirt 21 tangentially of the pressure chamber. Such gas enters chamber 23 through the inlet opening 27, and whirls in the chamber to form a central vortex therein and also in the nozzle opening 14. It is pointed out that the inner end of the tubular liner 16 is rounded or beveled, as indicated at 28, so that the vortical flow of gas from pressure chamber 23 into the nozzle opening 14 is relatively free from shock and turbulence.

The orifice plate 11 comprises a disc having an axial or central orifice 29 coaxial with nozzle opening 14, such orifice being illustrated as cylindrical. In the illustrated embodiment, the orifice plate is formed of metal and has an annular cooling chamber 31 through which water is passed by means of suitable conduits 32 and 33. The wall of the orifice is protected by a tubular liner 34 which may be formed of a refractory such as tungsten.

Orifice plate 11 may also be formed of a suitable insulating material, such as a heat-resisting ceramic, and should be relatively thin. The upper surface of orifice plate 11 is preferably located relatively close to the lower surface of the nozzle, the indicated spacing being on the order of the diameter of the nozzle opening.

The diameter of orifice 29 should be on the order of that of nozzle opening 14. The orifice plate 11 causes the vortex in gas pressure chamber 23 to be relatively well defined and substantially cylindrical, so that the degree of constriction of the arc is a maximum.

The back electrode 12, which may also be referred to as the plate or base electrode, is maintained in spaced and insulated relationship beneath orifice plate 11 by means of an annular insulating and sealing element 36. Electrode 12 is shown to comprise a disc or ring of highly-conductive metal, such as copper, having a relatively large-diameter opening 37 formed centrally thereof and coaxially with nozzle opening 14 and orifice 29. The opening 37 is shown as being cylindrical, and as encompassed by a tubular liner 38 also formed of a refractory metal such as tungsten. A cooling chamber 39 is formed in the back electrode around liner 38, and forms part of a cooling circuit including water conduits 41 and 42.

Back electrode 12 is spaced a sufficient distance beneath orifice plate 11 that the electric arc, which passes between the back and nozzle electrodes as will be described subsequently, fans or spreads out considerably by the time it reaches the interior wall 43 of liner 38. As previously indicated, the diameter of opening 37 should be substantially greater than that of openings 14 and 29. Furthermore, the back electrode is preferably relatively thick. It follows that the arcing wall 43 has a surface area which is many times the surface area of the arcing portion of the back electrode of any previously-known high-temperature plasma-jet torch. It follows that the current density at any portion of the wall 43 is relatively low, so that erosion is minimized.

The erosion of the back electrode by the electric arc is also minimized for another highly important reason. In previously-known torches, the electric arc contacted a surface of the back electrode which was transverse to the axis of the torch and to the arc. It follows that in such torches, the extremely hot and well-ionized center portion of the arc produced a very severe erosion effect upon the portion of the back electrode engaged thereby. This is not possible in the present construction since the central portion of the arc must spread out and then engage the wall 43 at an angle, there being no direct bombardment of an arcing portion disposed transverse to the center of the electric arc.

A suitable controlled source of gas, indicated at 44, is connected through a conduit 46 to the annular chamber 47 formed between back electrode 12 and orifice plate 11. The gas pressure in chamber 47 may thus be accurately controlled and regulated. The gas introduced into chamber 47 should be non-oxidizing, such as the same one introduced into the pressure chamber 23. The flow of gas in chamber 47 may be caused to be vortical about the axis thereof, to insure against substantial arcing to the upper surface of the back electrode.

The means 13 to define a static pressure chamber may comprise a cup-shaped element 48 having its rim sealingly seated beneath an insulating gasket 49 the upper surface of which rests sealingly beneath the back electrode 12. A controlled gas pressure source 51 communicates through a conduit 52 to the static pressure chamber 53 in cup element 48. Gas source 51 is adapted to deliver a suitable non-oxidizing gas, for example the same gas delivered by source 24 and/or 44. It is to be understood that the three gas sources 24, 44 and 51 may be combined, and that the conduits therefrom may be supplied with suitable pressure regulating means.

A suitble source 54 of electric power is connected through a lead 56 to nozzle electrode 10, and through a lead 57 to plate or back electrode 12. The current source 54 should be a source of direct current, and should be so connected that the lead 56 to the nozzle is negative and the lead 57 to the plate is positive. Source 54 should be capable of delivering a very high current, of many hundreds of amperes, although the voltage delivered by source 54 is relatively low in comparison to the current.

METHOD OF THE INVENTION RELATING PARTICULARLY TO THE EMBODIMENT OF FIGURES 1–3

Stated generally, the method comprises maintaining an electric arc between the nozzle and back electrodes, and causing the arc portion adjacent the back electrode to spread over a relatively large surface to thereby minimize erosion. The arc is caused to pass through an orifice in a shield or barrier element disposed between the nozzle and back electrodes. Constricting gas is introduced between the orifice and the nozzle opening, and flows out the latter. A certain proportion of the gas passing through the nozzle opening serves to protect the wall thereof, and flows in a vortical manner, but additional gas passing through the nozzle opening is in the form of electrical plasma (comprising neutral gas, ions and electrons at high temperatures) which streams or jets above the nozzle as indicated at 58.

With particular reference to the embodiment of FIGURES 1–3, the method comprises causing gas to flow from source 24 through tangential conduit 26 and inlet opening 27 into pressure chamber 23 at sufficient pressure that the absolute pressure within the chamber 23, after any initial expansion through inlet opening 27, is at least 1.6 times the absolute pressure outside the torch. The pressure is preferably much higher, however, particularly where extremely high temperatures are desired, since the higher pressure effects a greater constriction of the arc with consequent high current-density and temperatures. The gas sources 44 and 51 are than turned on to create pressures in chambers 47 and 53. Such pressures should be somewhat higher than the pressure in chamber 23 near the vortex. However, at least in the case of static chamber 53, the pressure may be substantially reduced in order to effect creation of auxiliary or back-firing plasma jets as will be described with reference to FIGURES 3 and 4.

The current source 24 is then turned on, and an arc is initiated between the nozzle 10 and back electrode 12 by various means, which may include bridging a thin piece of graphite therebetween to cause initial conduction of current. When the nozzle is supplied with negative direct voltage and the plate with positive direct voltage, the electric arc from plate 12 passes through the nozzle opening 14 and enters the nozzle in the region indicated at 59 in FIGURE 1, which provides numerous advantages as described in the above-cited co-pending patent application. As previously described, the arc enters the plate at the wall 43 of liner 38, the large surface area of such wall causing a minimized current density at any point with consequent relatively low erosion.

The portion of the electric arc in gas pressure chamber 23 is constricted to the vortex in the whirling gas, which greatly elevates the temperature thereof and results in the formation of the very high-temperature plasma jet indicated at 58. The portion of the electric arc in chamber 47, however, is not constricted substantially but instead is permitted to fan out below orifice 29 and engage the wall 43 as above described.

When the torch is operated as shown in FIGURE 1, the gas pressure in static chamber 53 is caused to be sufficiently high to prevent plasma from backfiring into the static pressure chamber, so that substantially all the plasma passes upwardly through orifice 29 and out of the nozzle opening 14. Referring to FIGURE 3, a condition is illustrated wherein the pressure in static chamber 53 is caused to be substantially less than in the showing of FIGURE 1. Under such conditions, a second or auxiliary plasma jet 61 streams downwardly into the chamber 53 in a direction diametrically opposite to that of the primary jet 58. The length of such second jet 61 may be increased by reducing the pressure in chamber 53, or by raising the pressure in chamber 47.

APPARATUS AND METHOD RELATING PARTICULARLY TO THE EMBODIMENT OF FIGURE 4

A second or back-firing plasma jet, such as the one shown at 61 in FIGURE 3, may be employed for a number of beneficial purposes. For example, with reference to FIGURE 4, an apparatus is shown for passing through both of the jets 61a and 58a a material which it is desired to heat to a high temperature for purposes which may include refining, spraying, etc. Such material may comprise, for example, a powder introduced together with a carrier gas from a controlled source indicated at 62. Source 62 is shown as communicating with the lower end of a cylindrical extension 63 provided axially on the bottom of cup 48a of the static pressure chamber means 13a.

Figure 4:
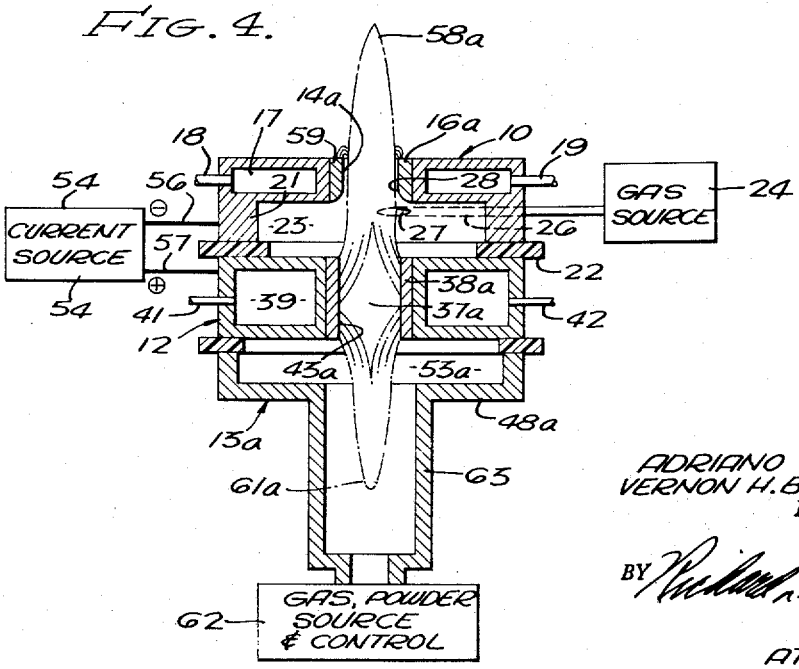
FIGURE 4 is a longitudinal central sectional view showing an embodiment in which the orifice plate is not employed, and in which the back-fire or auxiliary plasma jet is longer than the one shown in FIGURE 3.

In the embodiment of FIGURE 4, the orifice plate 11, insulating ring 36, and closely associated parts are not employed, so that gasket 22 seats on back electrode 12. The remaining components in FIGURE 4 correspond to those described with relation to FIGURES 1–3, and have been correspondingly numbered.

The back electrode opening 37a in FIGURE 4 is shown as being reduced in diameter, but the diameter thereof should be at least on the order of that of the nozzle opening 14a. Some of the whirling gas in pressure chamber 23 flows downwardly through opening 37a and, in combination with the electric arc between the nozzle and back electrodes, forms the auxiliary or back-fire plasma jet 61a in extension 63. The length of the second jet 61a depends upon such factors as the gas pressure in static pressure chamber 53a, the jet becoming longer as the static pressure is reduced. The elements 62, 63, etc., may also be employed in the embodiment of FIGURES 1–3.

In accordance with the method as shown in FIGURE 4, the gas pressure from source 62 is caused to be relatively low, so that the back-firing jet 61a is relatively long and streams a considerable distance into the extension 63. The powder from source 62 enters the jet 61a and is forced upwardly, due to the pressure from the source 62, into the opening 37a and thence into the arc and the primary plasma jet 58a. Plasma jet 58a may then, for example, be directed at an object which it is desired to coat with metal or ceramic.

It is pointed out that the above method causes the powder to travel through both jets 61a and 58a, so that there is a heating period of considerable duration. Such protracted heating period, in combination with the very high temperatures which may be created with the present torch, means that highly refractory materials may be melted or vaporized.

EMBODIMENT OF FIGURE 5

Figure 5:
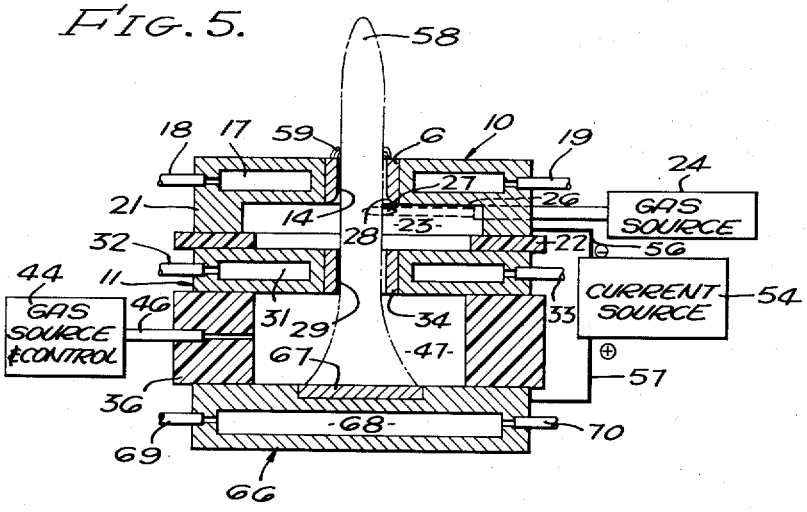
FIGURE 5 is a longitudinal central sectional view which shows, in schematic form, an embodiment in which the back electrode has an arcing surface disposed generally radially to the axis of the arc and jet.

FIGURE 5 illustrates an embodiment which, at all portions including and above the annular insulating element 36, is identical to the embodiment of FIGURES 1–3 and has been given the same reference numerals. The recessed or opened back electrode 12 of the previous embodiments is replaced, in the embodiment of FIGURE 5, by a disc-shaped solid back electrode 66 into which is axially inset a refractory arcing portion 67 formed of tungsten or the like. Electrode 66 is provided with a cooling chamber 68 through which water or other coolant is fed by means of conduits 69 and 70.

The upper surface of electrode 66 may, instead of being perfectly radial to the arc, be protuberant so that the tungsten inert 67 is closer to orifice plate 11 than is the remainder of the back electrode. For example, the portion of back electrode 66 radially inwardly of insulator 36 and radially outwardly of insert 67 may be generally frustoconical, the axis of the frustoconical surface being coaxial with the arc.

In the operation of the embodiment of FIGURE 5, the electric arc is maintained between portion 59 and portion 67 of the back electrode, passing through the nozzle opening 14 and the orifice 29 as in the case of the embodiment of FIGURES 1–3. The portion of the arc between the nozzle and the orifice plate 11 is constricted by the whirling gas from source 24, but the arc portion between the orifice plate and the back electrode is permitted to fan out so that a larger surface of the back electrode is engaged than would be the case if no orifice plate were employed. Such fanning out of the base portion of the arc has the effect, as previously indicated, of reducing the erosion of the insert 67.

EMBODIMENT OF FIGURES 6 AND 7

Figure 6:
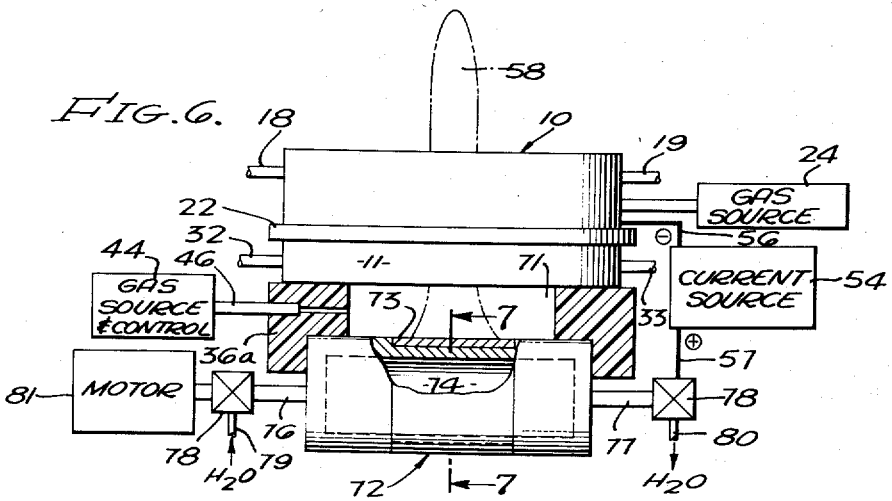
FIGURE 6 is a view, partially in side elevation and partially in central section, showing a torch corresponding to that of FIGURE 5 but having a rotating back electrode.
Figure 7:
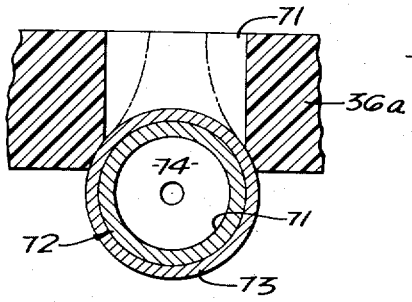
FIGURE 7 is an enlarged fragmentary sectional view taken along line 7—7 of FIGURE 6.

The apparatus illustrated in FIGURE 6 is identical to that described with relation to the embodiments of FIGURES 1–3 and 5, at all points above insulating element 36a. The element 36a of the embodiment of FIGURE 6 is, however, not perfectly annular but is instead formed internally with an elongated opening 71. The opening 71 extends longitudinally of a cylindrical back electrode 72, the latter being disposed with its longitudinal axis perpendicular to and intersecting the common axis of elements 10 and 11.

The underside of element 36a is recessed in a manner corresponding to the shape of the upper portion of the back electrode cylinder, but in such manner that the electrode 72 may rotate about its longitudinal axis without rubbing excessively against the element 36a. This relatively close-fitting provides a means for preventing excessive escape of gas from the opening 71 downwardly around the electrode 72. Additional sealing means, not shown may be provided for this purpose.

The back electrode 72 is formed of highly conductive metal, such as copper, and has a tubular insert 73 inset therearound in the mid-portion thereof, such insert being formed of refractory metal such as tungsten. The electrode is hollow, being provided with a water chamber 74. Water is conducted through the chamber 74 by means of axial shafts 76 and 77 which are provided with internal water passages, not shown, and which rotate in bearings indicated schematically at 78. Water is fed into and out of the respective bearings 78 by means of conduits indicated schematically at 79 and 80, such conduits communicating with the passages in shafts 76 and 77 and thus with the water chamber 74.

One of the shafts, number 76, is driven by a motor 81. The other shaft serves as a means for conducting electric current to the electrode 72, the bearing 78 therefor being shown as connected to the positive terminal of the current source 54. Current may therefore flow from the source 54 through lead 57, bearing 78, shaft 77, and thus the body of electrode 72 to the insert 73.

The cylindrical electrode 72 may be replaced by a disc-shaped electrode rotated about an axis which is preferably generally parallel to the axis of openings 14 and 29 but is offset therefrom. Rotation of such disc-shaped electrode therefore presents different portions of the electrode surface to the electric arc.

In the operation of the embodiment of FIGURE 6, the motor 81 is energized to drive the electrode 72, thereby presenting different portions of the outer surface of insert 73 to the electric arc which is created due to application of current from source 54 as previously indicated. This has the effect of increasing the life of the back electrode 72 because the erosion of insert 73 is spread out over a relatively large area. Furthermore, the cooling effect of the water flowing through chamber 74 is greatly multiplied since all portions of the insert 73 are constantly being cooled by the flowing water, not only during arcing but also during rotation from the arcing position through a major portion of a revolution back to the arcing position.

EMBODIMENT OF FIGURES 8–10

Figure 8:
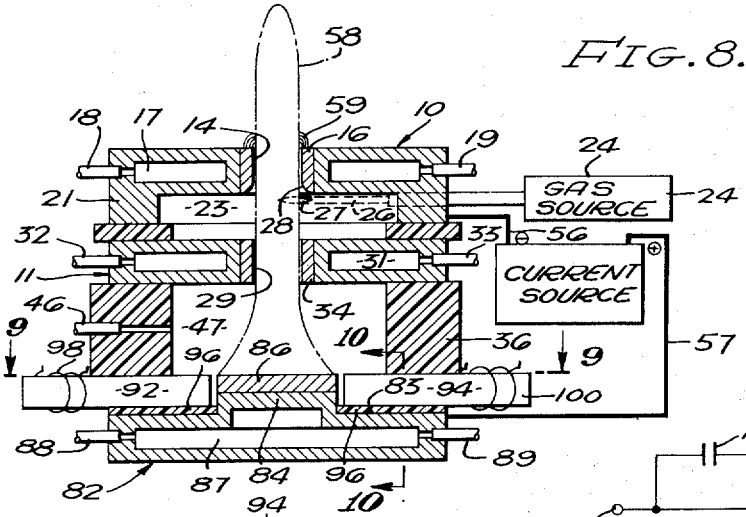
FIGURE 8 is a schematic longitudinal central sectional view of a plasma-jet torch incorporating means to provide a rotating magnetic field transverse to the electric arc, thereby effecting spreading of the arc over a large surface of the back electrode.

Referring to FIGURE 8, the portion of the torch at points above and including the insulating ring 36 is the same as was described with relation to FIGURES 1–3, and has been given the same reference numerals. In this embodiment, however, means are provided to generate a rotating magnetic field in a plane transverse to the arc to thereby effect additional spreading of the portion of the arc which contacts the back electrode 82.

Figure 10:
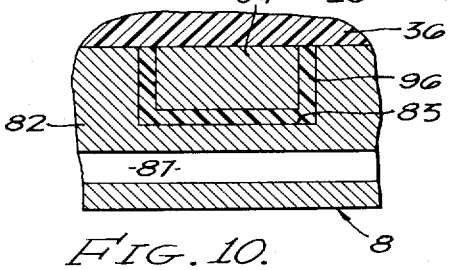
FIGURE 10 is an enlarged transverse fragmentary section taken along line 10—10 of FIGURE 8.
Figure 9:
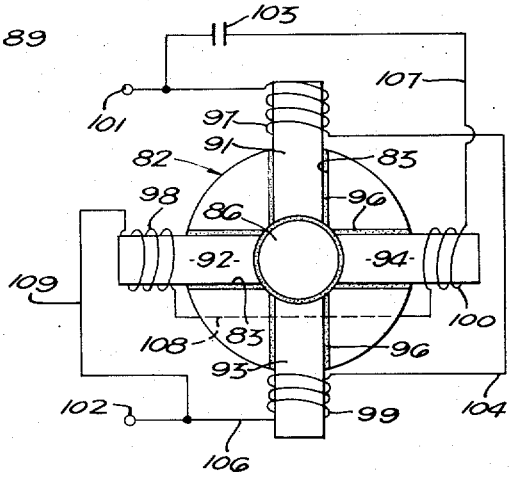
FIGURE 9 is a transverse sectional view taken along line 9—9 of FIGURE 8 and schematically indicating electric circuit means for creating the rotating magnetic field.

Back electrode 82 is illustrated in FIGURES 8–10 as being generally disc-shaped and as having four equally spaced channels 83 radiating outwardly from a central disc-shaped arcing portion 84. The upper surface of portion 84 is protected by a disc 86 formed of a refractory metal such as tungsten. The interior of the electrode is provided with a water chamber 87, fed by conduits 88 and 89, through which cooling water is passed for the purpose of cooling the tangsten disc 86.

Mounted in the various channels 83 are four bars 91–94 formed of magnetizable material such as soft iron, and which may be suitably laminated. Suitable insulating and sealing material 96 is provided to maintain the bars 91–94 electrically separate from the body of the back electrode, and to maintain the chamber 47 within insulator 36 sealed against downward flow of gas.

The respective bars 91–94 are provided with coils 97–100 which are so connected as to create a rotating magnetic field. Such coils may be connected to a suitable three-phase A.C. source, or a single-phase source may be employed. For example, electric terminals 101 and 102 may be connected to a suitable source of single-phase A.C. electric power, not shown, and a capacitor 103 employed to split the phase and provide a rotating magnetic field as desired. More specifically, terminal 101 may be connected to coil 97, thence through a lead 104 to coil 99, and thence through lead 106 to terminal 102. Terminal 101 may also be connected to capacitor 103, thence through lead 107 to coil 100, thence through lead 108 to coil 98, and thence through lead 109 to terminal 102.

In the operation of the embodiment of FIGURES 8–10, power is applied to the terminals 101 and 102 to provide a rotating magnetic field around the arcing disc 86 and in a plane generally transverse to the longitudinal axis of the torch. Such rotating magnetic field tends to draw or spread the ionized particles away from the center of the arcing disc 86, and thereby decrease the wear and erosion on such disc. It is to be understood that a rotating magnetic field may also be employed in connection with the embodiment shown in FIGURES 1–3.

EMBODIMENT OF FIGURE 11

Figure 11:
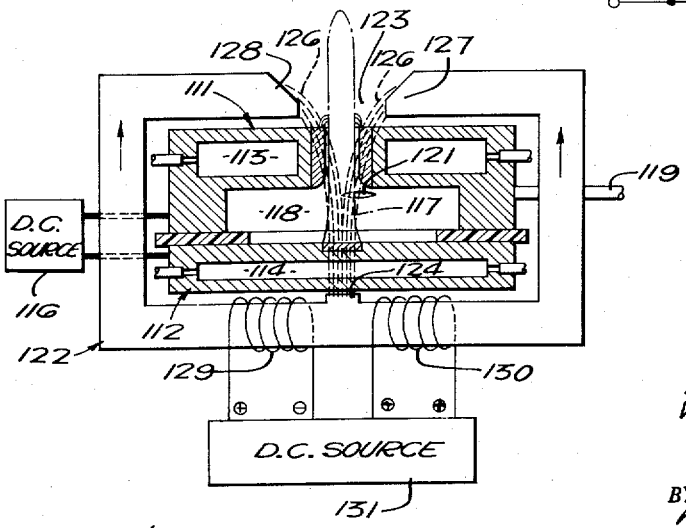
FIGURE 11 is a view, partially in vertical central section and partially in side elevation, schematically illustrating a plasma-jet torch associated with magnet means for creating a Fermi mirror effect with consequent reduced erosion of the back electrode.

Referring next to FIGURE 11, an electrical plasma-jet torch is shown schematically as having a nozzle electrode 111 and a base electrode 112 which are generally disc-shaped and are provided with cooling chambers 113 and 114. A nozzle opening is formed centrally of the nozzle electrode 111, and a direct current source 116 is connected across the electrodes to create the arc and plasma jet indicated at 117. Gas is introduced tangentially into the annular gas pressure chamber 118 through a conduit 119 and tangential inlet 121.

A generally rectangular magnetizable frame or core 122, formed of soft iron or other magnetizable substance, is provided around the torch and has a gap or opening 123 adjacent the nozzle opening. Frame 122 also has a protruding portion 124 disposed immediately beneath the central or arcing portion of back electrode 112.

Electrical windings are provided on frame 122 in such manner as to effect passage of lines of magnetic force or flux 126 between the ends 127 and 128 of frame 122, on opposite sides of the gap or opening 123, and the protruding portion 124. Such windings are schematically indicated at 129 and 130 and may be connected to a suitable source 131 of direct current. The polarity of the connections to source 131, and the manner of winding the coils, are such that the lines of force or flux pass upwardly through the sides of frame 122, as indicated by the arrows, and then pass downwardly from the ends 127 and 128 through the back electrode 112 to the protruding portion 124. Thus, the coils are in bucking relationship.

It is within the scope of the invention to run the current from the D.C. source 116 through coils 129 and 130, instead of providing a separate source 131. It is also within the scope of the invention to employ a continuous cup-shaped frame extending substantially completely around the plasma-jet torch, or to provide a substantial number of frames disposed at various radial positions in order to increase the magnetic field strength and to cause the lines of force 126 to simulate an upwardly diverging cone. Also, the polarity of the source 131 may be reversed.

It is pointed out that the frame ends 127 and 128 are disposed relatively far apart, so that the lines of force 126 converge downwardly before entering the protruding portion 124. Such bunching of the lines of force near the arcing portion of the back electrode 112 has the effect, when the magnetic field strength is high, of tending to reflect or repel the ionized particles away from the back electrode. This is known as the Fermi mirror effect, and results in decreased erosion of the back electrode since the particles engage the same with reduced velocity.

It is within the scope of the invention to control the static pressure in chambers, such as numbers 47 and 53 in FIGURE 1, by controlled bleeding of gas therefrom instead of by providing gas sources such as numbers 44 and 51. Thus, one or more of the gas sources 44 and 51 may be replaced by bleed valve means adapted to control the rate of bleed.

Various embodiments of the present invention, in addition to what has been illustrated and described in detail, may be employed without departing from the scope of the accompanying claims.

We claim:

1. In a plasma-jet torch, a nozzle electrode having a nozzle opening therein, a back electrode having an arcing region spaced from said nozzle opening whereby an electric arc may be struck between said arcing region and said nozzle electrode in the vicinity of said nozzle opening, and means to cause the current density of the portion of said arc at said arcing region of said back electrode to be substantially lower than that of a portion of said arc more remote from said arcing region of said back electrode, said last-mentioned arc portion being between said arcing region of said back electrode and said nozzle opening.

2. In a plasma-jet torch, a nozzle electrode having a nozzle opening therein, a back electrode having a relatively large-area arcing region spaced from said nozzle opening, mechanical barrier means disposed between said nozzle opening and said arcing region, said barrier means having an opening therein through which an arc may pass in traveling between said nozzle electrode in the vicinity of said nozzle opening and said arcing region of said back electrode, and means to effect spreading out of the portion of said arc between said barrier means and said arcing region of said back electrode whereby the current density at said arcing region is relatively low and the erosion thereof is minimized.

3. A plasma-jet torch, which comprises a nozzle electrode, a back electrode spaced and insulated from said nozzle electrode and having an arcing portion, said arcing portion comprising wall means to define a recess or opening in said back electrode, said wall means extending generally longitudinally of an arc passing between said nozzle electrode in the region of said nozzle opening and said arcing portion, and barrier means interposed between said nozzle opening and said arcing portion, said barrier means having an opening therein through which said arc may pass.

4. In a plasma-jet torch, a nozzle electrode having a nozzle opening therein, a back electrode, orifice means disposed between said nozzle electrode and said back electrode, said orifice means having an orifice therein through which an electric arc may pass in traveling between said back electrode and said nozzle electrode in the region of said nozzle opening, and means to introduce a fluid into said torch in the space between one of said electrodes and said orifice means in a manner effecting constriction of the portion of the arc therebetween.

5. A plasma-jet torch, which comprises a nozzle electrode having a nozzle opening therethrough, a back electrode having an arcing portion spaced from said nozzle electrode generally opposite said nozzle opening, an orifice plate disposed between said nozzle opening and said arcing portion and dividing the torch into an arc-constricting chamber and an arc-spreading chamber, said plate having an orifice therein through which an arc may pass in traveling between said nozzle in the region of said nozzle opening and said arcing portion of said back electrode, means to introduce fluid into said arc-constricting chamber in a manner effecting constriction of the portion of said arc therein, and means to effect spreading out of the portion of the arc in said arc-spreading chamber.

6. The invention as claimed in claim 5, in which means are provided to maintain said orifice plate electrically neutral and apply negative direct voltage to said nozzle electrode and positive direct voltage to said back electrode, in which said arc-constricting chamber is between said nozzle electrode and said orifice plate, and in which said fluid-introduction means comprises means to pass gas vortically in said arc-constricting chamber to form a vortex between said nozzle opening and said orifice in said orifice plate.

7. A plasma-jet torch, which comprises a nozzle electrode having an nozzle opening therein, a back electrode, means to mount said back electrode in spaced and insulated relationship relative to said nozzle electrode, wall means provided in said back electrode to define a recess or opening therein, and means to cause at least a major portion of said wall means to act as one terminus of an arc passing between said back electrode and said nozzle electrode in the region of said nozzle opening, said recess or opening in said back electrode having a cross-sectional area, which is at least as great as the cross-sectional area of said nozzle opening.

8. A plasme-jet torch, which comprises a nozzle electrode having a nozzle opening formed therethrough, a back electrode having an opening therethrough generally opposite said nozzle opening, said back electrode opening having a size at least on the order of the size of said nozzle opening, means to define a static pressure chamber in communication with said back electrode opening and on the side of said back electrode remote from said nozzle electrode and means to maintain an arc between said electrodes in the region of said opening.

9. The invention as claimed in claim 8, in which means are provided to introduce a gas into said static pressure chamber and to control the pressure of said gas relative to the pressure on the side of said back electrode relatively adjacent said nozzle electrode, thereby effecting generation of a back-firing plasma jet moving in a direction from said back electrode opening into said static pressure chamber, said back-firing plasma jet having a length determined at least partially by said gas pressure in said static pressure chamber.

10. The invention as claimed in claim 9, in which means are provided to effect passage of a substance first through said backfiring plasma jet in a direction opposite to the direction of movement thereof and then through said arc in a direction from said back electrode to and through said nozzle opening in order to effect heating of said substance for a time interval determined at least partially by the length of said back-firing plasma jet.

11. A plasma-jet torch, which comprises a generally disc-shaped nozzle electrode having a nozzle opening in the central portion thereof, a generally disc-shaped orifice plate spaced from said nozzle electrode and coaxial therewith, said orifice plate having an orifice formed opposite said nozzle opening, means to define a generally annular gas chamber between said nozzle electrode and orifice plate coaxially of said openings therein, means to introduce gas tangentially into said annular chamber for whirling or vortical flow therein and subsequent expansion out said nozzle opening, a back electrode mounted on the side of said orifice plate remote from said nozzle opening and spaced a substantial distance from said orifice plate, said back electrode having an opening formed therein generally coaxial to said nozzle opening and said orifice, said back electrode opening having a substantially larger diameter than the diameter of said orifice, means to maintain a controlled gas pressure at the side of said back electrode remote from said orifice plate and in communication with said back electrode opening, means to maintain the portion of said orifice plate encompassing said orifice in substantially insulated relationship from said nozzle electrode and back electrode, and means to apply a voltage between said nozzle electrode and back electrode to effect passage of an electric arc from the wall of said opening in said back electrode and through said orifice to the region of said nozzle electrode surrounding said nozzle opening, the portion of said arc between said nozzle electrode and orifice plate being constricted to the vortex in said whirling gas.

12. The invention as claimed in claim 11, in which said voltage means includes means to apply negative direct voltage to said nozzle electrode and positive direct voltage to said back electrode whereby said arc passes through said nozzle opening and enters said nozzle in a portion thereof relatively remote from said orifice plate.

13. The invention as claimed in claim 11, in which said nozzle opening, said orifice and said back electrode opening are coaxial and are defined by generally cylindrical walls, in which the portion of said nozzle electrode surrounding said nozzle opening and relatively adjacent said orifice plate is beveled to effect a smooth and shock-free flow of gas outwardly from said annular chamber through said nozzle opening, and in which means are provided to introduce gas into the space between said orifice plate and back electrode under controlled pressure.

14. A plasma-jet torch apparatus, which comprises a nozzle electrode having a nozzle opening therein, an orifice plate having an orifice therein, means to mount said orifice plate in spaced generally coaxial relationship relative to said nozzle electrode and insulated therefrom, means to define an annular gas pressure chamber between said orifice plate and said nozzle electrode and coaxial with said nozzle opening and with the orifice in said orifice plate, means to pass gas into said annular chamber for vortical flow therein and subsequent expansion through said nozzle opening, back electrode mounted generally parallel to said orifice plate on the side thereof remote from said nozzle electrode, means to insulate said back electrode from said orifice plate and to define a gas pressure chamber therebetween, means to apply voltage between said nozzle electrode and said back electrode to maintain an electric arc therebetween and passing through said orifice, and means to maintain a controlled gas pressure in said chamber between said orifice plate and said back electrode, said last-mentioned means operating to maintain said gas pressure sufficiently low to permit spreading of said arc over a considerable area of said back electrode and thus reduce the current density of the arc where it enters said back electrode.

15. In an electrical plasma-jet torch, a nozzle electrode having a nozzle opening therein, a relatively large back electrode, means to rotatably mount said back electrode in spaced and insulated relationship relative to said nozzle electrode, and means to rotate said back electrode to cause different portions thereof to be relatively adjacent said nozzle electrode whereby an electric arc may be maintained between said nozzle electrode and said different portions of said back electrode to thus increase the life of said back electrode.

16. The invention as claimed in claim 15, in which barrier means are interposed between said nozzle electrode and back electrode, said barrier means having an opening through which said arc may pass.

17. The invention as claimed in claim 15, in which said back electrode is generally cylindrical, in which said means to rotatably mount said back electrode comprises bearing means for permitting rotation of said back electrode about its longitudinal axis, said longitudinal axis of said back electrode being generally transverse to the axis of said nozzle opening, and in which means are provided to pass water through said back electrode.

18. A plasma-jet torch, which comprises a nozzle electrode having a nozzle opening therein, a back electrode, means to mount said back electrode in spaced and insulated relationship relative to said nozzle electrode whereby an electric arc may pass between said nozzle electrode and back electrode in the region of said nozzle opening, and means to generate a rotating magnetic field in a plane transverse to said arc and relatively close to said back electrode whereby the portion of said arc adjacent said back electrode is spread over a relatively large surface thereof.

19. In an electrical plasma-jet torch, a nozzle electrode having a nozzle opening therethrough, an orifice member spaced from said nozzle electrode and having an orifice therein generally coaxial with said nozzle opening, a back electrode disposed on the opposite side of said orifice member from said nozzle electrode and having an arcing portion generally coaxial with said nozzle opening and orifice, means to introduce a fluid to between said nozzle electrode and said orifice member in a manner effecting constriction of the adjacent portion of an electric arc passing between said nozzle electrode and back electrode, and means to generate a rotating magnetic field around the arcing portion of said back electrode and in a plane transverse to said electric arc, thereby effecting spreading of the portion of said arc between said orifice member and said back electrode.

20. In combination with an electrical plasma-jet torch having a nozzle electrode and a back electrode, magnetic means to generate magnetic lines of force which converge in a direction from one electrode of said torch toward the arcing portion of the other electrode of said torch, said lines of force tending to creat a Fermi mirror and thus reduce the velocity at which particles of the electric arc in said torch engage said arcing portion.

21. Electric plasma-jet torch apparatus, which comprises a nozzle electrode having a nozzle opening therein, a back electrode spaced and insulated from said nozzle electrode, means to introduced fluid between said electrodes to constrict an electric arc passing between said nozzle electrode in the region of said nozzle opening and an arcing portion of said back electrode, a magnet frame associated with said electrodes, and means to generate strong magnetic lines of force in said magnet frame, said magnet frame and said last-named means being adapted to effect passage of lines of force through the space between said nozzle electrode and said back electrode and in a manner converging toward said arcing portion of said back electrode, said converging lines of force tending to reflect particles travelling toward said arcing portion of said back electrode to thereby reduce the erosive effect of said particles on said back electrode.

22. A method of generating a high-temperature plasma jet and achieving long electrode life, which comprises providing a nozzle electrode having a nozzle opening therein, providing a back electrode spaced from said nozzle electrode, separating the space between said nozzle and back electrodes into two communicating chamber portions one of which is relatively adjacent said nozzle electrode and the other of which is relatively adjacent said back electrode, maintaining an electric arc between said back electrode and said nozzle electrode, continuously passing a fluid into said one chamber portion to effect constriction of the part of the electric arc therein, and permitting the part of the electric arc in said other chamber portion to expand prior to engaging said back electrode whereby the current density of said arc at said back electrode is minimized.

23. The invention as claimed in claim 22, in which said method includes the step of applying a negative direct voltage to said nozzle electrode and a positive direct voltage to said back electrode.

24. The invention as claimed in claim 22, in which said method includes generating a rotating magnetic field around the portion of said arc in said other chamber portion, said field being in a plane generally transverse to said arc to effect spreading of said arc over a relatively large area of said back electrode.

25. A method of maintaining a high-temperature plasma jet and of prolonging the electrode life in a torch generating said jet, which comprises providing a nozzle electrode having a nozzle opening therein, providing a back electrode spaced and insulated from said nozzle electrode, providing a relatively neutral orifice member between said nozzle and back electrodes and having an orifice therein generally coaxial with said nozzle opening, maintaining an electric arc between said nozzle electrode and said back electrode, said arc passing through said orifice in said orifice member, and passing gas vortically between said nozzle electrode and said orifice member to constrict the portion of said electric arc therebetween and create a very high-temperature plasma jet passing out said nozzle opening, said gas being introduced at an absolute pressure at least 1.6 times the absolute pressure on the side of said nozzle opening remote from said orifice member.

26. The invention as claimed in claim 25, in which said method comprises providing a back electrode having an opening therethrough, and varying the gas pressure on the side of said back electrode opening remote from said orifice member relative to the pressure between said orifice member and said back electrode to thereby create a secondary or auxiliary plasma jet passing from said back electrode opening in a direction opposite to said first-mentioned plasma jet and having a length depending upon said relative pressure.

27. An electrical plasma-jet torch, comprising means to define a first chamber and a second chamber having a common partition wall, said wall having an opening therein, electrode means disposed in the torch on opposite sides of said opening to maintain an electric arc in said first and second chambers and through said opening, and nozzle means to discharge from the torch plasma resulting from the presence of said arc.

28. An electrical plasma-jet torch, comprising means to define a first chamber and a second chamber having a common partition wall, said wall having an opening therein, electrode means disposed in the torch on opposite sides of said opening to maintain an electric arc in said first and second chambers and through said opening, nozzle means to discharge from the torch plasma resulting from the presence of said arc, means to introduce fluid into said first chamber in a manner operating to effect constriction of the portion of said arc therein, means to effect expansion of the portion of said arc in said second chamber, and means to prevent substantial arcing to said partition around said opening whereby at least the major arc in said torch during continuous operation thereof is directly between said electrodes.

*29. An electrical plasma-jet torch, which comprises a first electrode having an arcing portion, a second electrode electrically insulated from said first electrode, said second electrode having an arcing portion spaced from said arcing portion of said first electrode, barrier means having at least a portion disposed between said arcing portions of said electrodes and at least substantially electrically insulated from both of said electrodes, said barrier means having a passage or opening therethrough through which an electric arc may pass between said arcing portions of said electrodes, means to maintain a high-current electric arc between said arcing portions of said electrodes and through at least a portion of said passage or opening, means to effect forced flow of gas through said passage or opening, and means to effect a substantially continuous relative shifting between at least one of the terminals of said arc and the arcing portion to which it strikes to thus prevent said one terminal from overheating a part of the associated arcing portion, whereby the life of said associated arcing portion is increased.*

*30. The invention as claimed in claim 29, in which said arcing portion associated with said one terminal is annular in shape and coaxial with said passage or opening and has a diameter substantially greater than that of said passage or opening.*

*31. The invention as claimed in claim 29, in which said means to effect said relative shifting comprises means to generate a magnetic field at said one terminal, and in which said gas flow means is adapted to effect whirling gas flow around said arc.*

*32. An electrical plasma-jet torch, which comprises a barrier means having a passage or opening therethrough, a first electrode having an arcing portion substantially larger in diameter than said passage or opening, said arcing portion of said first electrode being disposed on one side of said barrier means, a second electrode having an arcing portion disposed to maintain an electric arc through at least part of said passage or opening to said arcing portion of said first electrode, both of said electrodes being substantially electrically isolated from said barrier means, means to maintain a high-current electric arc between said arcing portions of said first and second electrodes and through at least part of said passage or opening, means to effect forced flow of gas through said passage or opening whereby said gas is heated by said arc, and means to effect continuous relative shifting between said arcing portion of said first electrode and the associated terminal of said arc to thus prevent said arc from overheating said arcing portion of said first electrode.*

*33. The invention as claimed in claim 32, in which said gas flow means is adapted to effect vortical flow of gas in said passage or opening and about the axis thereof.*

*34. An electrical plasma-jet torch, which comprises a barrier means having a passage or opening therethrough, a first electrode having an arcing portion disposed on one side of said barrier means opposite said passage or opening, a second electrode having an arcing portion disposed on the opposite side of said barrier means to maintain an electric arc through said passage or opening to said arcing portion of said first electrode, means to maintain a high-current electric arc between said arcing portions of said first and second electrodes and through said passage or opening, means to effect rapid vortical flow of gas in said passage or opening about the axis thereof whereby said gas is heated by said arc, and means to effect continuous relative movement between said arcing portion of said first electrode and the arc terminal associated therewith.*

*35. The invention as claimed in claim 34, in which the diameter of said passage or opening is substantially smaller than the diameter of said arcing portion of said first electrode.*

*36. An electrical plasma-jet torch, which comprises means to define a first chamber, means to define a second chamber, barrier means disposed between said first and second chambers to separate the same, said barrier means having a passage or opening therethrough to effect communication between said chambers, a first electrode having at least a portion disposed in said first chamber, a second electrode insulated from said first electrode and having at least a portion disposed in said second chamber, means to maintain a high-current electric arc between said electrodes through at least part of said passage or opening, means to effect flow of gas between said chambers through said passage or opening, and outlet means communicating with one of said chambers to discharge plasma therefrom.*

*37. An electrical plasma-jet torch, which comprises means to define a first chamber, means to define a second chamber, barrier means disposed between said first and second chambers to separate the same, said barrier means having a passage or opening therethrough to effect communication between said chambers, a first electrode having at least a portion disposed in said first chamber, said portion having an annular arcing region coaxial with said passage or opening, a second electrode insulated from said first electrode and having at least a portion disposed in said second chamber, means to maintain a high-current electric arc between said electrodes through at least part of said passage or opening, nozzle means communicating with said second chamber to discharge gas from said second chamber, and means to introduce gas into said first chamber for flow through said passage or opening and thence through said second chamber and out of said nozzle means, said gas being heated by said arc.*

*38. The invention as claimed in claim 37, in which magnetic means are provided to effect continuous rotation about the axis of said passage or opening of the terminal portion of said arc at said annular arcing region of said first electrode.*

*39. The invention as claimed in claim 37, in which said last-named means includes means to effect vortical flow*

*of said gas in said first chamber and in said passage or opening.*

*40. The invention as claimed in claim 37, in which said means to maintain said arc is a D.C. source having its positive terminal connected to said first electrode and its negative terminal connected to said second electrode.*

*41. An electrical plasma-jet torch, which comprises means to define a first chamber, means to define a second chamber, passage or opening means to effect communication between said chambers, a first electrode having at least a portion disposed in said first chamber, said portion having an arcing region the diameter of which is substantially larger than that of said passage or opening means, a second electrode insulated from said first electrode and having at least a portion disposed in said second chamber, means to maintain a high-current electric arc between said electrodes, said arc passing from said arcing region through said passage or opening means and through at least portions of said first and second chambers, means to effect continuous relative shifting between said arcing region and the associated terminal of said arc, nozzle means communicating with said second chamber to discharge plasma from said second chamber, and means to introduce gas tangentially into said first chamber for flow through said passage or opening means and thence through said second chamber and out said nozzle means, said gas being heated by said arc.*

*42. A method of generating a plasma jet and achieving long electrode life, which comprises maintaining a high-current electric arc through at least a portion of a passage or opening in a barrier member which is at least substantially insulated from the electrodes between which said arc is maintained, causing at least one terminal of said arc to be disposed substantially farther from the axis of said passage or opening than is the wall of said passage or opening, effecting rapid relative movement between said one terminal and the electrode with which it is associated, and effecting forced flow of gas through said passage or opening.*

*43. The invention as claimed in claim 42, in which said method includes the step of effecting said flow of gas in whirling manner around said arc.*

*44. The invention as claimed in claim 42, in which said method includes the step of employing a barrier member at least the passage-defining wall portion of which is formed of insulating material.*

*45. The invention as claimed in claim 42, in which said method includes the step of effecting magnetic rotation of said one terminal about a circle coaxial with said passage or opening and having a substantially larger diameter.*

*46. A method of generating an electrical plasma jet and achieving long electrode life, which comprises providing a first electrode having a relatively large-diameter arcing portion, providing a second electrode in axially spaced and insulated relationship relative to said first electrode, maintaining a high-current electric arc between the arcing portion of said second electrode and said arcing portion of said first electrode, rotating the terminal of said arc at said first electrode through a large-diameter closed path along said arcing portion thereof whereby said terminal is prevented from burning into said first electrode, and effecting a flow of gas between said arcing portions and around said arc to effect constriction of said arc and heating of said gas, said last-named step being so conducted that said gas flow has a relatively large component directed radially-inwardly toward the arc.*

*47. The invention as claimed in claim 46, in which said last-named step comprises effecting whirling flow of gas between said arcing portions and about the axis of said electrodes, and disposing mechanical means between said electrodes to aid said whirling gas in constricting said arc to the vicinity of said axis.*

References Cited in the file of this patent or the original patent

UNITED STATES PATENTS

| | | |
|---|---|---|
| 2,411,893 | Peters | Dec. 3, 1942 |
| 2,806,124 | Gage | Sept. 10, 1957 |